United States Patent
Sinkula

[15] 3,689,645
[45] Sept. 5, 1972

[54] ERYTHROMYCIN AMIDES AS ANTIBACTERIAL AGENTS

[72] Inventor: Anthony A. Sinkula, 2607 Pine Ridge Road, Kalamazoo, Mich. 49001

[22] Filed: March 17, 1971

[21] Appl. No.: 125,357

Related U.S. Application Data

[62] Division of Ser. No. 824,679, May 14, 1969, Pat. No. 3,597,415.

[52] U.S. Cl. ................................................. 424/181
[51] Int. Cl. ............................................... A61k 21/00
[58] Field of Search ..................................... 424/181

[56] References Cited

UNITED STATES PATENTS

| | | | |
|---|---|---|---|
| 2,857,312 | 10/1958 | Stephens | 260/210 R |
| 3,262,951 | 7/1966 | Katz | 260/211 |
| 3,366,624 | 1/1968 | Argoudelis et al. | 260/210 |

*Primary Examiner*—Jerome D. Goldberg
*Attorney*—Roman Saliwanchik and John Kekich

[57] ABSTRACT

Erythromycin amides having the following formula:

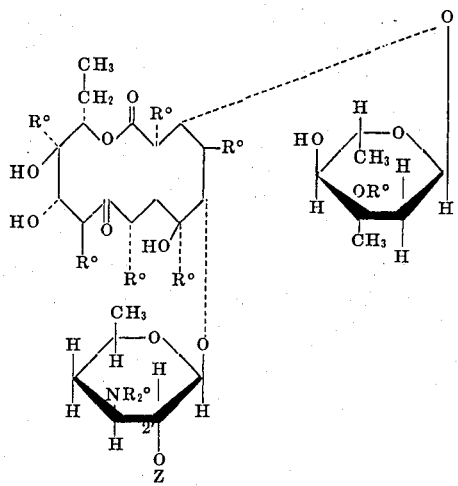

wherein:

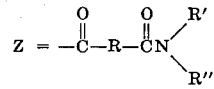

$R^o = CH_3$

R = the radical obtained by the removal of the two carboxyl groups from a dicarboxylic acid which can be dehydrated to an inner anhydride.

R' and R'' = H, alkyl of from one to 20 carbon atoms, inclusive, and isomeric forms thereof, cycloalkyl of three to eight carbon atoms, inclusive, and aralkyl of not more than 12 carbon atoms.

Erythromycin amides are superior tasting erythromycin compounds possessing erythromycin antibacterial activities and the same uses as erythromycin.

8 Claims, No Drawings

ERYTHROMYCIN AMIDES AS ANTIBACTERIAL AGENTS

CROSS REFERENCE TO RELATED APPLICATION

This is a division of co-pending application Ser. No. 824,679, filed May 14, 1969, now U.S. Pat. No. 3,597,415.

BRIEF SUMMARY OF THE INVENTION

This invention relates to novel derivatives of the antibiotic erythromycin A and to processes for the preparation thereof, and is particularly directed to erythromycin A amides, and to processes for producing them.

Erythromycin is a well known antibiotic produced by the organism *Streptomyces erythreus* as described in U.S. Pat. No. 2,653,899. In the original erythromycin fermentations, as described in U.S. Pat. No. 2,653,899, there were produced several closely related antibiotic materials which were designated erythromycin A, erythromycin B, and erythromycin C. Erythromycin A is distinguishable from erythromycin B and C by having a higher degree of activity against susceptible bacteria. Thus, erythromycin A is preferred when the use of an erythromycin antibiotic is indicated. U.S. Pat. Nos. 2,823,203 and 2,833,696 disclose processes for the preparation of erythromycin A.

The novel compounds of the invention can be shown as follows:

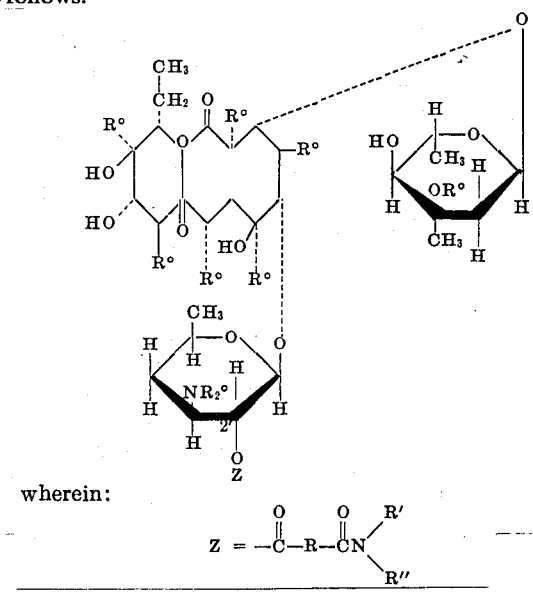

wherein:

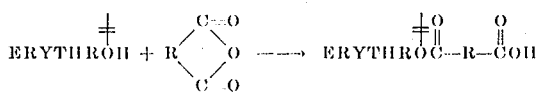

$R^0 = CH_3$

R = the radical obtained by the removal of the two carboxyl groups from a dicarboxylic acid which can be dehydrated to an inner anhydride.

R' and R" = H, alkyl of from one to 20 carbon atoms, inclusive, and isomeric forms thereof, cycloalkyl of three to eight carbon atoms, inclusive, and aralkyl of not more than 12 carbon atoms.

These compounds can be prepared by first converting erythromycin A to a hemiester, and then reacting this compound with an amine in the presence of a dehydrating agent to form erythromycin A amide.

The erythromycin amides of the subject invention possess a less bitter taste than erythromycin A while retaining the antibacterial activity of erythromycin A. Thus, the novel erythromycin A amides are useful in pediatric formulations.

DETAILED DESCRIPTION

The first step of the process to make the novel compounds of the invention involves reacting erythromycin A with an anhydride of a dibasic carboxylic acid (also referred to as a "dicarboxylic inner anhydride") to produce an erythromycin A-2'-hemiester. The reaction can be shown as follows:

$$\text{ERYTHROH} + R\underset{C=O}{\overset{C=O}{\diagup\diagdown}}O \longrightarrow \text{ERYTHROC}\underset{\parallel}{\overset{O}{\phantom{|}}}-R-\overset{O}{\underset{\parallel}{\phantom{|}}}\text{COH}$$

wherein R is the radical obtained by the removal of the two carboxyl groups from a dicarboxylic acid which can be dehydrated to an inner anhydride. Suitable acids are succinic acid, glutaric acid, maleic acid, phthalic acid, adipic acid, and the like. While these simple and more readily available dicarboxylic inner anhydrides will ordinarily be used in the reaction to make an erythromycin hemiester, it is to be understood that more complicated anhydrides, as disclosed in U.S. Pat. No. 2,957,864, can be used.

The esterification step of the subject invention, disclosed above, can be carried out in accordance with established procedure as disclosed in U.S. Pat. Nos. 2,857,312 and 2,957,864. This esterification of erythromycin A replaces the hydroxyl group of the desosamine moiety.

The second step to make erythromycin A amides is to react the erythromycin A hemiester, prepared as disclosed above, with an amine in the presence of a dehydrating agent, for example, dicyclohexylcarbodiimide (DCC). The reaction is carried out in an inert anhydrous solvent that will solubilize the reactants (erythromycin A hemiester, amine, and DCC). The term "inert" is used herein in accordance with the second definition of "solvent" in Hackh's Chemical Dictionary, third edition, to mean "a liquid which dissolves another substance without any change in chemical composition," in contradiction to those types of solvents which dissolve by a chemical reaction. Suitable solvents include acetone, ether, chloroform, methylene chloride, acetonitrile and tetrahydrofuran, dimethyl sulfoxide, dioxane, or combinations thereof.

The reaction is run, advantageously, at room temperature (26° C.) to minimize side reactions. However, the reaction can be run within a temperature range of 10° to 60° C.

The reaction is generally complete in about 48–72 hours when it is run at room temperature. Obviously, higher temperatures will shorten the reaction time. Also, the reaction time can be reduced by the occasional addition of excess amounts of amine and DCC.

Amines which can be used in the reaction are

wherein R' and R" are hydrogen, alkyl of from one to 20 carbon atoms, inclusive, and isomeric forms thereof, cycloalkyl of from three to eight carbon atoms, inclusive, and aralkyl of not more than 12 carbon atoms.

Examples of alkyl of from one to 20 carbon atoms are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl, and the isomeric forms thereof. Examples of cycloalkyl are cyclopropyl, cyclobutyl, cyclopentyl, cyclohexyl, cyclohexylmethyl, cycloheptyl, cyclooctyl, 2-methylcyclopentyl, 2,3-dimethylcyclobutyl, 4-methylcyclobutyl, 3-cyclopentylpropyl, and the like. Examples of aralkyl are benzyl, phenethyl, α-phenylpropyl, α-naphthylmethyl, and the like.

Erythromycin amides by virtue of their basic amino groups form addition salts with both organic and inorganic acids. These salts can be prepared from the erythromycin amide free base by methods conventionally employed for the preparation of acid addition salts of basic antibiotics. For example, the free base can be neutralized with the appropriate acid to below about pH 7.5, and advantageously to about pH 2 to pH 6. Salts which can be made are as follows: (1) alkyl carboxylate salts,

where $X = C_1$ to $C_{17}$; (2) alkyl sulfate salts, $XSO_3^{\ominus}$ where $X = C_1$ to $C_{18}$, for example, laurylsulfate; (3) aromatic carboxylate salts, for example, benzoate, salicylate, o-benzoylbenzoate, 5,5'-methylenebissalicylate, and 5-phenylsalicylate; (4) aliphatic dicarboxylate salts, for example, malonate, succinate, α,β-dibromosuccinate, tartrate, maleate, sebacate, adipate, and malate; (5) inorganic acid salts, for example, hydrochloride, sulfate, phosphate, and hydrobromide; and (6) other acid addition salts, for example, glutamate, glucoheptanoate, gluconate, lactobionate, citrate, mandelate, phenylbutyrate, α-ethyl-γ-phenylbutyrate, α-benzamido-β-benzylmercaptobutyrate, N-(4'-nitrobenzoyl) glutamate, 4-phenylbenzylate, cyclohexanepropionate, α-(4-xenyl) phenylacetate, fencholate, monobenzyl succinate, 4-phenyl benzoate, 4(4'-phenylazo) benzoate, 2,4,6-trimethylbenzoate, 4(4'-tosylamido) benzoate, 2,6-dimethyl-4-carbamylbenzoate, 2,6-dimethyl-4-acetamidobenzoate, 2,3,5,6-tetramethylbenzoate, α-naphthoate, monobutylphthalate, 4-(4'-nitrophenyl) benzoate, 4-cyclohexyloxybenzoate, veratrate, naphthalate, isophthalate, benzophenone-2,4-dicarboxyate mono salt, benzophenone-2,4-dicarboxyate di salt, 1,1'-binaphthalene-8,8'-dicarboxylate mono salt and di salt, β-resorcylate, gentisate, 5-bromosalicylate, 4-aminosalicylate, 3-phenylsalicylate, 4-phenylsalicylate, 4-phenylgentisate, 5-nitro-3-phenylsalicylate, pamoate, syringate, vanillate, thiosalicylate, cinnamate, α-benzamido cinnamate, 4-nitrocinnamate, 3,4-methylenedioxycinnamate, 2-methoxycinnamate, α-ethylcinnamate, tannate, 3-indoleacetate, and 2-indolecarboxylate.

Salts of erythromycin amides can be used for the same biological purposes as the free base.

The following illustrate the use in formulations of the compositions of the present invention. All percentages are by weight and all solvent mixture proportions are by volume unless otherwise noted.

The compositions of the present invention are preferably presented for administration to humans and animals in unit dosage forms, such as tablets, capsules, powders, granules, sterile parenteral solutions or suspensions, and oral solutions or suspensions, containing suitable quantities of erythromycin amide or its pharmacologically acceptable salts.

For oral administration either solid or fluid unit dosage forms can be prepared. For preparing solid compositions such as tablets, the principal active ingredient is mixed with conventional ingredients such as talc, magnesium stearate, dicalcium phosphate, magnesium aluminum silicate, starch, lactose, acacia, methylcellulose, and functionally similar materials as pharmaceutical diluents or carriers. In their simplest embodiment, capsules, like tablets, are prepared by mixing the antibiotic with an inert pharmaceutical diluent and filling the mixture into a hard gelatin capsule of appropriate size. Soft gelatin capsules are prepared by machine encapsulation of a slurry of the antibiotic with corn oil, light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydro-alcoholic (ethanol) vehicle with suitable sweeteners such as sugar, saccharin, and cyclamate together with an aromatic flavoring agent. Suspensions can be prepared of the insoluble forms with a syrup vehicle with the aid of a suspending agent such as acacia, tragacanth, methylcellulose and the like.

Topical ointments can be prepared by dispersing the antibiotic in a suitable ointment base such as petrolatum, lanolin, polyethylene glycols, mixtures thereof, and the like. Advantageously, the antibiotic is finely divided by means of a colloid mill utilizing light liquid petrolatum as a levigating agent prior to dispersing in the ointment base. Topical creams and lotions are prepared by dispersing the antibiotic in the oil phase prior to the emulsification of the oil phase in water.

For parenteral administration, fluid unit dosage forms are prepared utilizing the antibiotic and a sterile vehicle, water being preferred. The antibiotic, depending on the form and concentration used, can be either suspended or dissolved in the vehicle. In preparing solutions the water-soluble antibiotic can be dissolved in water for injection and filter sterilized before filling into a suitable vial or ampule and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the powder prior to use. Parenteral suspensions are prepared in substantially the same manner except that the antibiotic is suspended in the vehicle instead of being dissolved and sterilization cannot be accomplished by filtration. The antibiotic can be sterilized by exposure to ethylene oxide before suspending in the sterile vehicle. Advantageously, a surfactant or wetting agent is included in the composition to facilitate uniform distribution of the antibiotic.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, capsules, troches, suppositories, powder packets, granules, wafers, cachets, teaspoonfuls, tablespoonfuls, dropperfuls, ampuls, vials, segregated multiples of any of the foregoing, and other forms as herein described.

The dosage of erythromycin amide for treatment depends on route of administration; the age, weight, and condition of the patient; and the particular disease to be treated. For adults, a dosage schedule of from about 50 to 500 mg., 1 to 4 times daily (every 6 hours), embraces the effective range for the treatment of most conditions. For severe conditions, 4 Gm. or more a day can be used in divided doses. For infants the dosage is calculated on the basis of 15 mg./kg. by weight, and for children 15 to 25 mg./kg., to be administered every 6 hours.

The erythromycin amide is compounded with a suitable pharmaceutical carrier in unit dosage form for convenient and effective administration. In the preferred embodiments of this invention, the dosage units contain erythromycin amide in 25, 50, 100, 200, and 500 mg. amounts for systemic treatment; in 0.25, 0.5, 1 and 5 percent amounts for topical or localized treatment and 5 to 65 percent w/v for parenteral preparations. The dosage of compositions containing erythromycin amide and one or more other active ingredients is to be determined with reference to the usual dosage of each such ingredient. A dose of from about 1 mg./kg./day to about 60 mg./kg./day is preferred for systemic treatment.

The antibacterial activity of the invention compounds is exemplified in the following tables I and II. Table I shows the results of in vitro antibacterial tests. In these tests the compounds were incorporated into a two-fold serial dilution series of test tubes containing sterile Brain Heart Infusion broth (Difco) and inoculated with the bacteria cited. The tubes were incubated according to the art and examined for bacterial growth at 20 hours. Results are given as minimal inhibitory concentration (MIC), i.e., the minimal concentration of the compound, in micrograms per milliliter, which prevented bacterial growth.

TABLE I

In Vitro Antibacterial Activity

Minimal Inhibitory Concentrations (MIC)

| | Erythromycin base | Erythromycin-2'-hexyl-glutar-amide base | Erythromycin-2'-dicyclo-hexylglu-taramide lauryl sulfate | Erythromycin-2'-dodecyl-glutarr-amide pamoate | Erythromycin-2'-dodecyl-glutar-amide lauryl sulfate |
|---|---|---|---|---|---|
| Staphylococcus aureus | 0.1-.2 | 0.2 | 1.6 | 0.8 | 3.2 |
| Streptococcus hemolyticus | 0.4-1.6 | 0.8 | 12.5 | 6.4 | 25 |
| Streptococcus faecalis | 0.8-1.6 | 1.6 | 6.4 | 3.2 | 25 |
| Escherichia coli | 25 | 25 | >200 | 100 | >200 |
| Proteus vulgaris | 100-200 | 200 | >200 | >200 | >200 |
| Klebsiella pneumoniae | 3.2 | 6.4 | 25 | 12.5 | 50 |
| Salmonella schottmuelleri | 50 | 100 | >200 | 200 | >200 |
| Pseudomonas aeruginosa | 50-100 | 100 | 200 | 200 | 200 |
| Bacillus subtilis | <0.1 | <0.1 | 0.4 | 0.2 | 1.6 |

Table II shows the results of in vivo antibacterial tests. In these tests the compounds were administered orally as aqueous solutions or suspensions to mice infected with Streptococcus hemolyticus. The results are expressed as $CD_{50}$ [median protective dose; Spearman-Karber, "Statistical Methods in Biological Assay," 2d. ed., p. 524-530 (1964) Hafner Publishing Co., N.Y.].

TABLE II

In Vivo Antibacterial Activity

Median Protective Dose ($CD_{50}$)

| | Oral $CD_{50}$ | Ratio[1] |
|---|---|---|
| Erythromycin Base | 10(7.5-13) | 1.0 |
| Erythromycin-2'-hexyl-glutaramide Base | 15(11-20.5) | 1.5 |
| Erythromycin-2'-dodecyl-glutaramide Base | 10.8(8-14.5) | 1.08 |
| Erythromycin-2'-dicyclo-hexylglutaramide Base | 16.7(12-23) | 1.67 |

[1] Ration amide derivative/erythromycin base

These tests demonstrate that in addition to the markedly reduced bitter taste, the amide compounds of this invention retain the antibacterial properties of erythromycin.

The following examples are illustrative of the process and products of the present invention, but are not to be construed as limiting. All percentages are by weight and all solvent mixture proportions are by volume unless otherwise noted.

EXAMPLE 1

Erythromycin-2'-Hexyl Glutaramide

Erythromycin-2'-glutarate hemiester (8.48 g., 0.01 mole), prepared as described in Example 6 of U.S. Pat. No. 2,957,864, is dissolved in 65 ml. of anhydrous ether and 10 ml. of anhydrous acetone. 1.01 Gm. (0.01 mole) of n-hexylamine is dissolved in 10 ml. of anhydrous ether and added to the solution. Dicyclohexylcarbodiimide (DCC) (2.48 g., 0.012 mole) is dissolved in 40 ml. of anhydrous acetone and added to this solution of the hemiester and amine. Precipitation of dicyclohexyl urea begins in about one-half hour. After two hours another 0.5 gram of n-hexylamine and 0.25 gram of DCC is added to the reaction mixture. The solution is placed in a refrigerator for two days and then filtered and the solvent removed in vacuo at 30° C. The resulting precipitate is dissolved in 50 ml. of acetone and the remaining dicyclohexylurea filtered. The acetone solution is then concentrated to dryness in vacuo and the precipitate dissolved in 200 ml. anhydrous ether. The remaining precipitate is filtered and the ether solution extracted once with 200 ml. of a pH 6 aqueous solution of acetic acid. The ether layer is dried with $MgSO_4$ and the solvent removed. The precipitate of erythromycin-2'-hexyl glutaramide is washed with hexane and dried.

Elemental Analysis:
  Calcd for $C_{48}H_{86}N_2O_{15}$:
    C, 61.91; H, 9.31; N, 3.01; $H_2O$, 0.
  Found: C, 64.49; H, 9.03; N, 5.01; $H_2O$, 2.04.

EXAMPLE 2

Erythromycin-2'-Dodecyl Glutaramide

Erythromycin-2'-glutarate hemiester (8.48 g., 0.01 mole) is dissolved in 125 ml. of anhydrous ether and 50 ml. of anhydrous acetone. 1.85 g. (0.01 mole) of dodecylamine is dissolved in 50 ml. of anhydrous acetone and added to the solution. Dicyclohexylcarbodiimide (DCC) (2.48 g., 0.012 mole) is dissolved in 25 ml. of anhydrous ether and added to the mole) previous solution. Dicyclohexylurea begins precipitating in about 15 minutes. The solution is stirred for 48 hours. An additional 0.5 g. each of dodecylamine and DCC is then added and the solution stirred for another 24 hours. The solvent is removed in vacuo at 38° C. The resulting precipitate is dissolved in hexane and the insoluble dicyclohexylurea filtered. The hexane is removed in vacuo and the precipitate air dried for 12 hours. The compound is then dissolved in 100 ml. of acetone, and water is added to the cloud point. After placing the solution in a refrigerator overnight, there is obtained about 5 g. of relatively pure erythromycin-2'-dodecyl glutaramide.

Elemental Analysis:
  Calcd for $C_{54}H_{98}N_2O_{15}$:
    C, 63.88; H, 9.73; N, 2.76; $H_2O$, 0.
  Found: C, 63.74; H, 9.25; N, 4.45; $H_2O$, 5.00.

EXAMPLE 3

Erythromycin-2'-Dicyclohexyl Glutaramide

Erythromycin-2'-glutarate hemiester (12.72 g., 0.015 mole) is dissolved in 225 ml. of anhydrous ether and 50 ml. of anhydrous acetone. Dicyclohexylamine (2.73 g., 0.015 mole) is dissolved in 50 ml. of anhydrous acetone and added to the glutarate hemiester solution with stirring. Dicyclohexylcarbodiimide (DCC) (3.72 g., 0.018 mole) is dissolved in 50 ml. of anhydrous acetone and added to the reaction mixture. Stirring is continued for 24 hours. The solution is then filtered, the solvent removed in vacuo at 38° C., and the precipitate dried and pulverized. The precipitate is first washed with two 200 ml. portions of hexane, then dissolved in 100 ml. of acetone; water is added to the cloud point. After standing in a refrigerator overnight, the precipitate of erythromycin-2'-dicyclohexyl glutaramide is recovered by filtration and air-dried.

Elemental Analysis:
  Calcd. for $C_{54}H_{94}N_2O_{15}$:
    C, 64.13; H, 9.37; N, 2.77; $H_2O$, 0.
  Found: C, 63.57; H, 9.60; N, 4.49; $H_2O$, 2.93.

EXAMPLE 4

Erythromycin-2'-Dicyclohexyl Glutaramide Malate

Erythromycin-2'-dicyclohexyl glutaramide (10.11 g., 0.01 mole) is dissolved in 50 ml. of ether. Malic acid (2.01 g., 0.015 mole) is dissolved in 75 ml. of ether. The solutions are mixed, shaken for 3 minutes, filtered, and the resulting precipitate of erythromycin-2'-dicyclohexyl glutaramide malate is air dried for 2 hours.

EXAMPLE 5

Erythromycin-2'-Dicyclohexyl Glutaramide Pamoate

Erythromycin-2'-dicyclohexyl glutaramide malate (5 g., 0.0044 mole) is dissolved in 100 ml. of water and filtered. Sodium pamoate (1.30 g., 0.003 mole) is dissolved in 50 ml. of water and filtered. The solutions are mixed together and stirred for 5 minutes. The resulting yellow precipitate of erythromycin-2'-dicyclohexyl glutaramide pamoate is filtered and air-dried for 24 hours.

EXAMPLE 6

Erythromycin-2'-Dicyclohexyl Glutaramide Lauryl Sulfate

Erythromycin-2'-dicyclohexyl glutaramide malate (11 g., 0.0096 mole) is dissolved in 150 ml. of water and filtered. Sodium lauryl sulfate (3.17 g., 0.011 mole) is dissolved in 100 ml. of water and filtered. The solutions are combined and shaken for 1 minute. The resulting yellow gum is separated, dried, and pulverized to give erythromycin-2'-dicyclohexyl glutaramide lauryl sulfate.

Analysis:
  Calcd. for $C_{66}H_{120}N_2O_{19}S$:
    C, 62.04; H, 9.47; N, 2.19; S, 2.51; $H_2O$ 0 percent.
  Found: C, 62.16; H, 9.49; N, 3.11; S, 3.02; corrected for 1.93 percent $H_2O$.

EXAMPLE 7

Erythromycin-2'-Dodecyl Glutaramide Malate

Erythromycin-2'-dodecyl glutaramide (2 g., 0.002 mole) is dissolved in 50 ml. of ether. Malic acid (0.27 g., 0.002 mole) is dissolved in 50 ml. of ether. The solutions are combined and shaken. The precipitate of erythromycin-2'-dodecyl glutaramide malate is filtered and air-dried.

Analysis:
  Calcd. for $C_{58}H_{104}N_2O_{20}$:
    C, 60.61; H, 9.12; N, 2.44; $H_2O$, 0%.
  Found: C, 58.83; H, 8.30; N, 3.48; corrected for 2.42 percent $H_2O$.

EXAMPLE 8

Erythromycin-2'-Dodecyl Glutaramide Pamoate

Erythromycin-2'-dodecyl glutaramide malate (1.15 g., 0.001 mole) is dissolved in 100 ml. of water. Sodium pamoate (0.28 g., 0.00065 mole) is dissolved in 100 ml. of water. The solutions are each filtered and combined. The resulting precipitate of erythromycin-2'-dodecyl glutaramide pamoate is filtered and air-dried.

Analysis:

Calcd. for $C_{131}H_{212}N_4O_{36}$:
C, 65.04; H, 8.83; N, 2.32; $H_2O$, 0%.
Found: C, 64.88; H, 8.27; N, 3.40; corrected for 4.06 percent water.

EXAMPLE 9

Erythromycin-2'-Dodecyl Glutaramide Lauryl Sulfate

Erythromycin-2'-dodecyl glutaramide malate (1.15 g., 0.001 mole) is dissolved in 100 ml. of water. Sodium lauryl sulfate (0.288 g., 0.001 mole) is also dissolved in 100 ml. of water. The solutions are filtered and combined with stirring. The resulting precipitate of erythromycin-2'-dodecyl glutaramide lauryl sulfate is filtered and air-dried.

Analysis:
Calcd. for $C_{66}H_{124}N_2O_{19}S$:
C, 61.85; H, 9.75; N, 2.19; S, 2.50; $H_2O$, 0%
Found: C, 61.57; H, 9.85; N, 3.12; S, 2.79; corrected for 2.43 percent $H_2O$.

EXAMPLE 10

Capsules

One thousand two-piece hard gelatin capsules for oral use, each containing 250 mg. of erythromycin-2'-dodecyl glutaramide, are prepared from the following types and amounts of materials:

| | |
|---|---|
| Erythromycin-2'-dodecyl glutaramide | 250 Gm. |
| Corn starch | 150 Gm. |
| Talc | 75 Gm. |
| Magnesium stearate | 25 Gm. |

The materials are thoroughly mixed and then encapsulated in the usual manner.

The foregoing capsules are useful for the systemic treatment of infection in adult humans by the oral administration of one capsule every 4 hours.

Using the procedure above, capsules are similarly prepared containing the antibiotic in 50, 100, and 500 mg. amounts by substituting 50, 100 and 500 g. of antibiotic for the 250 g. used above.

EXAMPLE 11

Tablets

One thousand tablets for oral use, each containing 500 mg. of erythromycin-2'-dicyclohexyl glutaramide, are prepared from the following types and amounts of materials:

| | |
|---|---|
| Erythromycin-2'-dicyclohexyl glutaramide | 500 Gm. |
| Lactose | 125 Gm. |
| Corn starch | 65 Gm. |
| Magnesium stearate | 25 Gm. |
| Light liquid petrolatum | 3 Gm. |

The ingredients are thoroughly mixed and slugged. The slugs are broken down by forcing through a number 16 screen. The resulting granules are then compressed into tablets, each tablet containing 500 mg. of antibiotic.

The foregoing tablets are useful for systemic treatment of infections in adult humans by oral administration of 1 tablet every 4 hours.

Using the above procedure, except for reducing the amount of antibiotic to 200 g., tablets containing 200 mg. of antibiotic are prepared.

EXAMPLE 12

Tablets

One thousand oral tablets, each containing 125 mg. of erythromycin-2'-hexyl glutaramide and a total of 250 mg. (83.3 mg. each) of sulfadiazine, sulfamerazine, and sulfamethazine, are prepared from the following types and amounts of materials:

| | |
|---|---|
| Erythromycin-2'-hexyl glutaramide | 125 Gm. |
| Sulfadiazine | 83.3 Gm. |
| Sulfamerazine | 83.3 Gm. |
| Sulfamethazine | 83.3 Gm. |
| Lactose | 50 Gm. |
| Corn starch | 50 Gm. |
| Calcium stearate | 25 Gm. |
| Light liquid petrolatum | 5 Gm. |

The ingredients are thoroughly mixed and slugged. The slugs are broken down by forcing through a number 16 screen. The resulting granules are then compressed into tablets, each containing 125 mg. of antibiotic and a total of 250 mg. (83.3 mg. each) of sulfadiazine, sulfamerazine, and sulfamethazine.

The foregoing tablets are useful for systemic treatment of infections by the oral administration of four tablets first and then 1 every 6 hours.

For the treatment of urinary infections, the triple sulfas in the above formulation is advantageously replaced by 250 g. of sulfamethylthiadiazole or 250 g. of sulfacetamide.

EXAMPLE 13

Granules 2,367 g. of a granulation suitable for reconstitution with water prior to use is prepared from the following types and amounts of ingredients:

| | |
|---|---|
| Erythromycin-2'-dodecyl glutaramide | 150 Gm. |
| Sucrose, powdered | 2155 Gm. |
| Flavor | 60 Gm. |
| Sodium metabisulfite | 2 Gm. |

The erythromycin amide, sugar, flavor, and sodium metabisulfite are mixed together until thoroughly blended. The powder mixture is wetted with water and forced through a screen to form granules. The granules are dried and 23.67 g. filled into 60 cc. bottles. Prior to use sufficient water is added to the granules to make 60 cc. of composition.

The foregoing composition is useful for systemic treatment of infection, particularly in children at a dose of 1 teaspoonful (5 cc.) four times daily.

EXAMPLE 14

Oral Syrup 1,000 cc. of an aqueous preparation for oral use, containing in each 5 cc. dose, 250 mg. of erythromycin-2'-dodecyl glutaramide is prepared from the following types and amounts of ingredients:

| | |
|---|---|
| Erythromycin-2'-dodecyl glutaramide lactobionate | 50 Gm. |
| Citric acid | 2 Gm. |
| Benzoic acid | 1 Gm. |
| Sucrose | 700 Gm. |
| Tragacanth | 5 Gm. |
| Lemon oil | 2 Gm. |
| Deionized water q.s. | 1000 cc. |

The citric acid, benzoic acid, sucrose, tragacanth, and lemon oil are dispersed in sufficient water to make 850 cc. of solution. The antibiotic is stirred into the syrup until uniformly distributed. Sufficient water is added to make 1,000 cc.

The composition so prepared is useful in the systemic treatment of infection due to *Klebsiella pneumoniae* in adult humans at a dose of 1 or 2 teaspoonfuls 4 times a day.

EXAMPLE 15

Parenteral Suspension

A sterile aqueous suspension for intramuscular use, containing in 1 cc. 200 mg. of erythromycin-2'-hexyl glutaramide is prepared from the following types and amounts of materials:

| | | |
|---|---|---|
| Erythromycin-2'-hexyl glutaramide | 200 | Gm. |
| Lidocaine hydrochloride | 4 | Gm. |
| Methylparaben | 2.5 | Gm. |
| Propylparaben | 0.17 | Gm. |
| Water for injection q.s. | 1000 | Gm. |

All of the ingredients, except the antibiotic, are dissolved in the water and the solution sterilized by filtration. To the sterile solution is added the sterilized antibiotic and the final suspension is filled into sterile vials and the vials sealed.

EXAMPLE 16

Parenteral Solution

A sterile aqueous solution for intramuscular use, containing in 1 cc. 150 mg. of erythromycin-2'-hexyl glutaramide hydrochloride, is prepared from the following types and amounts of ingredients:

| | |
|---|---|
| Erythromycin-2'-hexyl glutaramide hydrochloride | 150 Gm. |
| Lactose | 50 Gm. |
| Water for injection q.s. | 1000 cc. |

The antibiotic and lactose are dissolved in the water and the solution sterilized by filtration. The sterile solution, in the amount of 2 cc., is aseptically filled into sterile vials and frozen. The water is removed under high vacuum and the vials containing the lyophilized powder are sealed. Just prior to use, sufficient water for injection to make 2 cc. of solution is added to the vial.

EXAMPLE 17

Topical Ointment 1,000 G. of 2 percent ointment is prepared from the following types and amounts of ingredients:

| | |
|---|---|
| Erythromycin-2'-hexyl glutaramide | 20 Gm. |
| Zinc oxide | 50 Gm. |
| Calamine | 50 Gm. |
| Liquid petrolatum (heavy) | 250 Gm. |
| Wool fat | 200 Gm. |
| White petrolatum q.s. | 1000 Gm. |

The white petrolatum and wool fat are melted and 100 g. of liquid petrolatum added thereto. The antibiotic, zinc oxide and calamine are added to the remaining liquid petrolatum and the mixture milled until the powders are finely divided and uniformly dispersed. The powder mixture is stirred into the white petrolatum mixture and stirring continued until the ointment congeals.

The foregoing ointment is usefully applied topically to the skin of mammals for the treatment of infection.

The foregoing composition can be prepared by omitting the zinc oxide and calamine.

Following the procedure above, ointments are similarly prepared containing erythromycin amides in 0.5, 1.0, and 5 percent amounts by substituting 5, 10, and 50 g. of antibiotic for the 20 g. used above.

EXAMPLE 18

Troches 10,000 Troches are prepared from the following types and amounts of ingredients:

| | |
|---|---|
| Erythromycin-2'-dodecyl glutaramide | 100 Gm. |
| Neomycin sulfate | 50 Gm. |
| Polymyxin B sulfate (10,000 units/mg.) | 1 Gm. |
| Ethyl aminobenzoate | 50 Gm. |
| Calcium stearate | 150 Gm. |
| Powdered sucrose q.s. | 5000 Gm. |

The powdered materials are mixed thoroughly and then compressed into half gram troches following the usual techniques for the preparation of compressed tablets.

The troches are held in the mouth and allowed to dissolve slowly to provide treatment for the mouth and throat of humans.

EXAMPLE 19

Mastitis Ointment 1,000 G. of an ointment for the treatment of mastitis in dairy cattle is prepared from the following types and amounts of ingredients:

| | | |
|---|---|---|
| Erythromycin-2'-dicyclohexyl glutaramide sulfate | 50 | Gm. |
| Prednisolone acetate | 0.5 | Gm. |
| Light liquid petrolatum | 300 | Gm. |
| Chlorobutanol, anhydrous | 5 | Gm. |
| Polysorbate 80 | 5 | Gm. |
| 2% Aluminum monostearate-peanut oil gel | 400 | Gm. |
| White petrolatum q.s. | 1000 | Gm. |

The antibiotic and prednisolone acetate are milled with the light liquid petrolatum until finely divided and uniformly dispersed. The chlorobutanol, polysorbate 80, peanut oil gel and white petrolatum are heated to 120° F. to form a melt and the liquid petrolatum dispersion stirred in. With continued stirring the dispersion is allowed to cool (and congeal) to room temperature and is filled into disposable mastitis syringes in 10 g. doses.

EXAMPLE 20

Animal Feed 1,000 G. of a feed mix is prepared from the following types and amounts of ingredients:

| | |
|---|---|
| Erythromycin-2'-hexyl glutaramide | 10 Gm. |
| Soybean meal | 400 Gm. |
| Fish meal | 400 Gm. |

| Wheat germ oil | 50 Gm. |
| Sorghum molasses | 140 Gm. |

The ingredients are mixed together and pressed into pellets.

The composition can be fed to laboratory animals, i.e., rats, mice, guinea pigs, and rabbits for prophylaxis during shipping.

For larger animals the composition can be added to the animal's regular feed in an amount calculated to give the desired dose of antibiotic.

EXAMPLE 21

Following the procedure of each of the preceding Examples 10 through 20, each member selected from the group consisting of erythromycin-2'-dicyclohexyl glutaramide malate, erythromycin-2'-dicyclohexyl glutaramide pamoate, erythromycin-2'-dicyclohexyl glutaramide lauryl sulfate, erythromycin-2'-dodecyl glutaramide malate, erythromycin-2'-dodecyl glutaramide pamoate and erythromycin-2'-dodecyl glutaramide lauryl sulfate is substituted in an equivalent amount for the particular form of erythromycin amide shown in the example to provide similar therapeutic properties.

I claim:

1. An antibacterial composition comprising, in unit dosage form, from about 25 to about 500 mg. of a member selected from the group consisting of a compound of the formula:

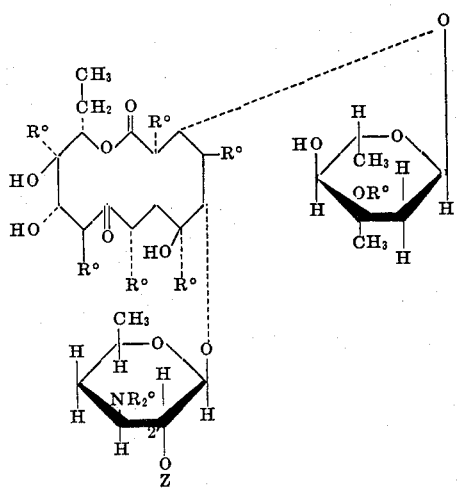

wherein:

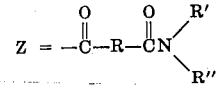

$R^0 = CH_3$

R = the radical obtained by the removal of the two carboxyl groups from a saturated or unsaturated aliphatic dicarboxylic acid containing from four to six carbon atoms, inclusive;

R' and R'' = H, alkyl of from one to 20 carbon atoms, inclusive, and isomeric forms thereof, cycloalkyl of three to eight carbon atoms, inclusive, and aralkyl of not more than 12 carbon atoms;

and its pharmacologically acceptable salts as an essential active ingredient in combination with a pharmaceutical carrier.

2. An antibacterial composition, according to claim 1, comprising from about 5 percent to about 65 percent of the compound of the formula.

3. A sterile antibacterial composition for parenteral administration comprising from about 5 percent to about 65 percent, w/v, of a member selected from the group consisting of a compound of the formula:

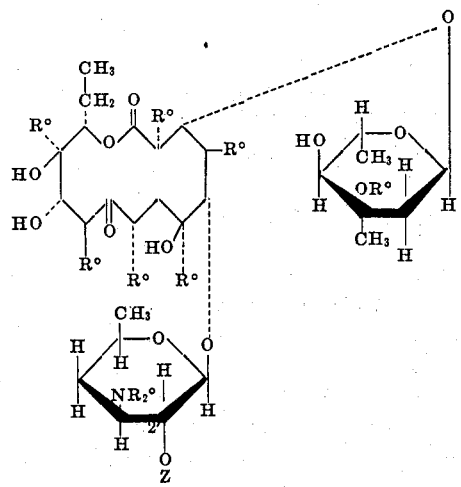

wherein:

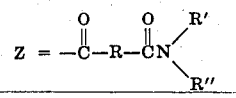

$R^0 = CH_3$

R = the radial obtained by the removal of the two carboxyl groups from a saturated or unsaturated aliphatic dicarboxylic acid containing from four to six carbon atoms, inclusive;

R' and R'' = H, alkyl of from one to 20 carbon atoms, inclusive, and isomeric forms thereof, cycloalkyl of three to eight carbon atoms, inclusive, and aralkyl of not more than 12 carbon atoms;

and its pharmacologically acceptable salts as an essential active ingredient in combination with a sterile vehicle.

4. The process for treating susceptible microbial antibacterial infectious disease in humans and animals which comprises the administering to the infected host a therapeutic antibacterial amount of a member selected from the group consisting of a compound of the formula:

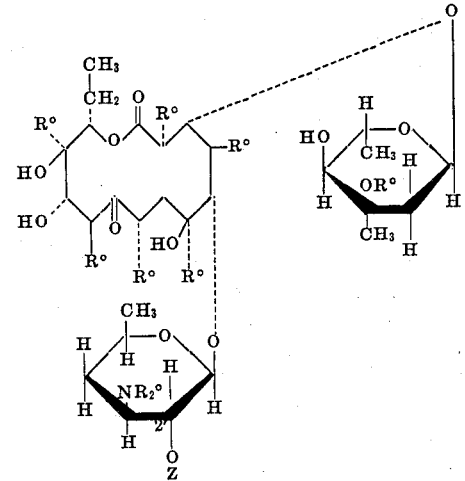

wherein:

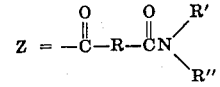

$R^0 = Ch_3$

R = the radical obtained by the removal of the two carboxyl groups from a saturated or unsaturated aliphatic dicarboxylic acid containing from four to six carbon atoms, inclusive;

R' and R'' = H, alkyl of from 1 to 20 carbon atoms, inclusive, and isomeric forms thereof, cycloalkyl of 3 to 8 carbon atoms, inclusive, and aralkyl of not more than 12 carbon atoms;

and its pharmacologically acceptable salts in combination with a pharmaceutical carrier.

5. A process, according to claim 4, wherein the compound of the formula is administered in unit dosage form in an amount of from about 25 to about 500 mg. of said compound in association with a pharmaceutical carrier.

6. A process, according to claim 4, wherein the compound of the formula is administered to the infected host in unit dosage form in an amount of from about 1 mg./kg./day to about 60 mg./kg./day of said compound in association with a pharmaceutical carrier.

7. A process of prophylactic treatment for the prevention of susceptible antibacterial infectious disease comprising the administering to a disease-susceptible human or animal host an effective antibacterial amount of a member selected from the group consisting of a compound of the formula:

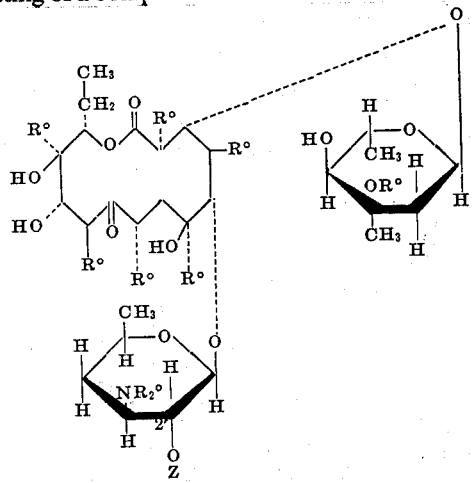

wherein:

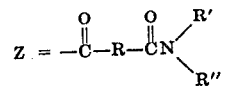

$R^o = CH_3$

R = the radical obtained by the removal of the two carboxyl groups from a saturated or unsaturated aliphatic dicarboxylic acid containing from four to six carbon atoms, inclusive;

R' and R'' = H, alkyl of from one to 20 carbon atoms, inclusive, and isomeric forms thereof, cycloalkyl of three to eight carbon atoms, inclusive, and aralkyl of not more than 12 carbon atoms;

and its pharmacologically acceptable salts in combination with a pharmaceutical carrier.

8. A process, according to claim 7, wherein the compound of the formula is administered in unit dosage form in an amount of from about 25 to about 500 mg. of said compound in association with a pharmaceutical carrier.

* * * * *

UNITED STATES PATENT OFFICE
CERTIFICATE OF CORRECTION

Patent No. 3,689,645　　　　　　　Dated September 5, 1972

Inventor(s) Anthony A. Sinkula

It is certified that error appears in the above-identified patent and that said Letters Patent are hereby corrected as shown below:

Column 5, line 65, for "glutarramide" read -- glutaramide --. Column 6, line 40, for "ration" read -- ratio --. Column 7, line 28, for "to the mole)" read -- to the --. Column 14, line 26, for "radial" read -- radical --; Column 14, lines 39-40, for "microbial antibacterial" read -- antibacterial --.

Signed and sealed this 30th day of January 1973.

(SEAL)
Attest:

EDWARD M. FLETCHER, JR.　　　　　ROBERT GOTTSCHALK
Attesting Officer　　　　　　　　Commissioner of Patents